United States Patent [19]

Melvin et al.

[11] 4,141,559
[45] Feb. 27, 1979

[54] TWO-PIECE SOLID GOLF BALL

[75] Inventors: Terence Melvin, Southbury; Joseph K. Pieroni, Newtown, both of Conn.; Frank S. Martin, Port Charlotte, Fla.; James F. Little, Watertown, Conn.

[73] Assignee: Uniroyal, Inc., New York, N.Y.

[21] Appl. No.: 754,715

[22] Filed: Dec. 27, 1976

[51] Int. Cl.² .................. A63B 37/00; A63B 37/12
[52] U.S. Cl. ........................ 273/220; 273/235 R; 273/232; 260/887
[58] Field of Search ............ 273/235 R, 232, 218, 273/235 A, 235 B, 220, 230, 62

[56] References Cited

U.S. PATENT DOCUMENTS

| | | | |
|---|---|---|---|
| 878,254 | 2/1908 | Taylor | 273/232 |
| 3,362,937 | 1/1968 | Kent | 273/235 X |
| 3,454,280 | 7/1969 | Harrison et al. | 273/218 X |
| 3,819,768 | 6/1974 | Molitor | 273/235 R X |
| 4,065,537 | 12/1977 | Miller et al. | 273/218 X |

FOREIGN PATENT DOCUMENTS

| | | | |
|---|---|---|---|
| 2338302 | 2/1974 | Fed. Rep. of Germany | 273/232 |
| 377354 | 7/1932 | United Kingdom | 273/232 |
| 1364138 | 8/1974 | United Kingdom | 273/218 |
| 1430843 | 4/1976 | United Kingdom | 273/218 |
| 1448451 | 9/1976 | United Kingdom | 273/218 |

OTHER PUBLICATIONS

"The Curious History of the Golf Ball" John Stuart Martin, Horizon Press, N.Y. pp. 127-131, Relied on.

*Primary Examiner*—George J. Marlo
*Attorney, Agent, or Firm*—James J. Long

[57] ABSTRACT

A two-piece molded golf ball comprised of a resilient core (polybutadiene-basic zinc methacrylate covulcanizate) and an ionomer resin cover, the cover having a dimple design of icosahedral array. This ball has superior flight performance compared to conventional two-piece molded balls.

1 Claim, 5 Drawing Figures

TWO-PIECE SOLID GOLF BALL

This invention relates to a two-piece solid molded golf ball.

Molded homogeneous solid golf balls based on cis-polybutadiene-basic zinc methacrylate type blends are known (see U.S. patent application Ser. No. 284,303, of Martin et al., filed Aug. 28, 1972; corresponding to British Pat. No. 1,448,451, Uniroyal, Inc., Sept. 8, 1976). In the present invention such composition is employed as the core of the ball only, the cover being of different composition and being dimpled in a particular way.

The use of ionomer resins in golf ball covers, over a solid core, is disclosed in U.S. Pat. No. 3,819,768, Molitor, June 25, 1974. However, use of such a cover having the herein-described dimple pattern, over the herein-described core, is not suggested in the Molitor patent.

U.S. patent application Ser. No. 276,185, Martin et al., filed July 28, 1972 (corresponding to British Pat. No. 1,407,730, Uniroyal, Inc., Sept. 24, 1975) discloses a gold ball (for example solid or wound) having a surface with molded round depressions arranged in icosahedral pattern. The cover of the ball may be made of ionomer resin composition. However, the use of such a dimpled cover with the herein-described core composition is not disclosed.

British Pat. No. 1,364,138, Acushnet Co., Aug. 21, 1974 discloses a golf ball composition based on polybutadiene and zinc ions together with methacrylic acid groups present in sufficient quantity to crosslink the polybutadiene (see also British Pat. No. 1,430,843, Princeton Chemical Research Inc., Apr. 7, 1976). The composition of Acushnet may be used as the core of a two-piece ball. The prior art does not disclose a core based on preformed basic zinc methacrylate as in the present invention, particularly in combination with an ionomer resin cover having the herein described dimpled surface.

The invention will be described with reference to the accompanying drawings, wherein.

Figure 1:
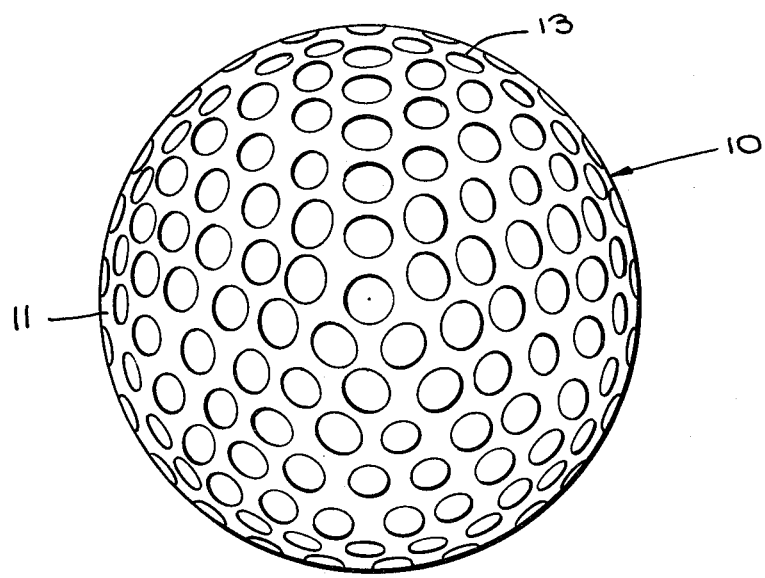
FIG. 1 is a top plan view of a golf ball constructed in accordance with the invention.

In accordance with the invention a two-piece solid molded golf ball having remarkably improved flight characteristics compared to prior art two-piece solid molded golf balls is provided having a cover comprising ionomer resin composition dimpled on the surface in a particular manner, and a core comprising a mixture of polybutadiene elastomer and basic zinc methacrylate type additive.

Ionomer resin compositions suitable for forming the cover of the ball are disclosed in U.S. Pat. No. 3,819,768 referred to above as well as U.S. Pat. No. 3,454,280, Harrison et al, July 8, 1969. The ionomer resin may be described as an ionic copolymer of an olefin having from 2 to 8 carbon atoms and a metal salt of an unsaturated monocarboxylic acid containing from 2 to 8 carbon atoms. Mixtures of ionomer rsins may be used. Small amounts of other materials such as pigments may be included.

Blends of polybutadiene and basic zinc methacrylate type additive suitable for use as the core of the ball are described in British Pat. No. 1,448,452 referred to above. The polybutadiene elastomer employed has a cis-1,4-polybutadiene content of 50% or more by weight, preferably at least 80%, and more preferably at least 95%. The basic zinc methacrylate type additive may be described as a preformed reaction product of zinc oxide and methacrylic acid in at least approximately equimolar proportions of zinc oxide to methacrylic acid. Usually the zinc oxide to methacrylic acid molar ratio is from approximately 1:1 to 1.5:1.

The basic zinc methacrylate type additive is preformed by slurrying zinc oxide in a volatile liquid medium (water or an alkanol, e.g., methanol, ethanol), the concentration of zinc oxide in the slurry being from 30 to 65% by weight. While agitating the slurry, the methacrylic acid is added rapidly. The liquid medium serves to dissipate the heat liberated by the exothermic reaction. The liquid medium is removed and the product is dried, usually to a volatile content of 2% or less. The product is finely ground, to a fineness such that at least about 99% passes a 325 mesh (U.S. series) or finer sieve. The product is white in color and usually has a pH of 6.0 to 6.3 in water. The assay of material having zinc oxide and methacrylic acid combined in the ratio required by basic zinc methacrylate is from about 85% to 100%. In thermogravimetric analysis the product usually shows about 3% weight loss at 120°–140° C., an additional 7–13% loss at 180°–240° C. and an additional 30–36% loss at 320°–430° C. In differential thermal analysis there is usually an endothermic peaking in the neighborhood of about 180° C., and a smaller endothermic peak in the neighborhood of about 235° C. Although the product is referred to as "basic zinc methacrylate", this is to imply only that the product contains the zinc and the methacrylic acid mainly in a one-to-one molar ratio. In contrast to this product, the normal salt (zinc dimethacrylate; zinc and methacrylic acid in one-to-two molar ratio) is unsuitable for use in the invention and gives poor results. Basic zinc methacrylate is described also in U.S. patent application Ser. No. 685,249, Martin et al., filed May 11, 1976. For purposes of the invention, the basic zinc methacrylate must be preformed as described, as opposed to formation "in situ" by adding zinc oxide and methacrylic acid to the polybutadiene. Such in situ preparation gives unsatisfactory results.

To make the core composition, the described preformed basic zinc methacrylate type product is blended with the polybutadiene elastomer in conventional rubber mixing equipment, such as a batch internal mixer, an extruder mixer, or an open roll mill, along with any other suitable desired modifying ingredients (e.g., fillers to adjust the specific gravity). Usually from about 10 to about 60 parts, preferably from about 25 to about 45 parts, of preformed zinc oxide-methacrylic acid reaction product are employed per 100 parts by weight of elastomer.

The core composition further contains, as a crosslinking or curing agent, a source of free radicals such as a peroxide, hydroperoxide, azo compound, or the like, or radiation such as ionizing radiation or ultra violet light may be used as the source of free radicals. There may be mentioned as suitable for this purpose such free radical curatives as dicumyl peroxide, lauroyl peroxide, benzoyl peroxide, 2,4-dichlorobenzoyl peroxide, 2,5-dimethy-2,4-di(t-butylperoxy) hexane, n-butyl-4,4-bis(t-butylperoxy) valerate, t-butylhydroperoxide, azobisisobutyronitrile, etc. The core composition is shaped into the form of a golf ball core, for example by compression or injection molding in a golf ball core mold, and the shaped composition is heated at a temperature sufficient to decompose the free-radical generating agent, for a time sufficient to bring about cure. When using n-butyl-4,4-bis(t-butylperoxy) valerate as the peroxide curative, a curing temperature of about 300° to 330° F. is the most desirable. Over-curing is undesirable and under-cure does not produce a good core. Those skilled in the art of free radical curing agents for polymers know how to adjust the cure time and temperature to obtain optimum results from any specific free radical agent. The elastomer becomes cross-linked during the cure and the methacrylate radical appears to enter into the reaction in some way so as to give enhanced hardness, possibly by bonding the zinc to the polymer.

Other ingredients may be present in the core composition. Thus, an ionomer (see U.S. Pat. Nos. 3,454,280 and 3,819,768 referred to above, as well as U.S. Pat. No. 3,421,766, Chmiel et al., Jan. 14, 1969, column 2, line 18 to column 3, line 5, for a disclosure of ionomers useful herein) may be admixed with the core composition, for example in amount of 1 to 30 parts per 100 parts by weight of the elastomer, especially as an aid to better processing, including smoother extrusion and better molding of the golf ball core. Such ionomer may be described as an ionic copolymer of at least 50 mole percent of one or more alpha-olefins together with a lesser amount of alpha, beta ethylenically unsaturated monocarboxylic acid or dicarboxylic acid, the acid monomer content of said copolymer being from 0.2 to 25 mole percent, said copolymer containing uniformly distributed throughout the copolymer a metal ion having an ionized valence of 1 to 3 inclusive in monocarboxylic acid-containing ionomers and a valence of 1 in dicarboxylic acid-containing ionomers. At least 10% (preferably at least about 30%) of the carboxylic acid groups of the copolymer are neutralized by the metal ions and exist in the ionic state. Ionomers based on copolymers of ethylene and acrylic or methacrylic acid are most common. The metal ions are commonly ions of Groups I, II, III, IV-A and VIII of the periodic table, the more common ones being ions of the alkali metals such as sodium and potassium, and the alkaline earth metals such as calcium, strontium, barium and such commonly available metals as zinc and aluminum. The ionomers are hard, transparent, resinous thermoplastic materials. (See Canadian Pat. Nos. 674,595, Nov. 19, 1963 and 713,631, July 13, 1965; also "Polymer preprints, A.C.S., Division of Polymer Chemistry, April 1965," Vol. 6, No. 1, pages 287-303).

Other materials such as fillers may also be added to the core compositions, for example litharge or zinc oxide in amount of for example 2 to 20 parts per 100 parts of elastomer, particularly for the purpose of increasing the specific gravity. Other compounding variations may be employed. For example, impact modifiers such as high molecular weight polyethylene as described in U.S. Pat. No. 3,478,132, Randolph, Nov. 11, 1969, may be added.

The thus-molded unitary core is a sphere having a diameter in excess of approximately 1.515 inches, which is subsequently ground (suitably with the use of a conventional centerless grinder, for example of the Glebar [trademark] type) to a diameter of approximately 1.505 inches. The core has preferably a PGA hardness (that is, "Professional Golf Association" hardness, also called stiffness or compression; see for example U.S. Pat. No. 3,362,937, Kent, Jan. 9, 1968, col. 8, lines 61-70) of about 65, measured on a conventional golf ball PGA hardness testing machine fitted with a 0.180 inch thickness shim to compensate for the smaller diameter of the core compared with a 1.680 inch diameter golf ball. The core has preferably a rebound (that is, the height to which the ball will bounce, expressed as a percentage of the height from which it is dropped onto a hard, flat, horizontal surface, such as a thick marble slab; see for example British Pat. No. 1,430,843, Princeton Chemical Research, Apr. 7, 1976, page 5, lines 17-19) of at least 75% and a specific gravity of about 1.20.

The cover composition for the present golf ball is, as indicated above, an ionomer resin, or a blend of ionomer resins (e.g. sodium copolymer "Surlyn [trademark] 1555" plus zinc copolymer "Surlyn 1557") of the kind described. A small amount of pigment (e.g., titanium dioxide) is added to make the cover compound opaque.

To form the dimpled cover of the molded ball of the invention, the cover composition is applied by injection molding directly onto the previously described core suspended by pins within a mold cavity. For this purpose a conventional retractable-pin mold, commercially available from Osley and Whitney Co., may be used. The cover is of sufficient thickness to produce a golf ball of approximately 1.680 inches minimum diameter. The injection molding sprue is removed from the ball and the ball is then centerless ground to remove gates and flash. The grinding or deflashing operation improves the flight characteristics of the ball. However, excessive grinding can unduly alter the width and depth of the dimples and impair the flight characteristics. The amount of grinding that would normally be just sufficient to remove the flash is ordinarily also sufficient to provide optimum flight characteristics.

Figure 2:
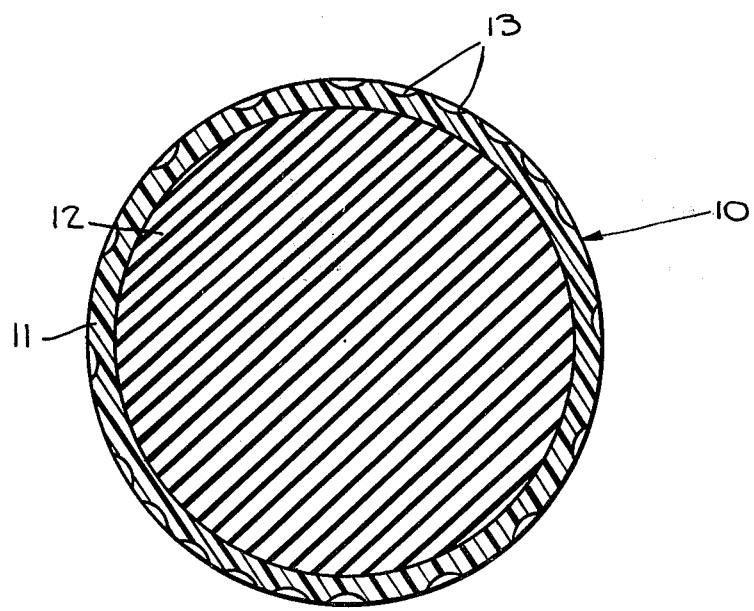
FIG. 2 is a cross-sectional view of the internal structure of the ball of FIG. 1.

As indicated above, an important feature of the golf ball of the invention resides in the dimpled surface pattern on the cover, imparted during the molding of the cover. Referring to the drawings, and particularly to FIGS. 1 and 2 thereof, the painted outer surface 10 of the golf ball cover 11 injection molded over the core 12 has a dimple pattern consisting of essentially 252 dimples 13 circular in cross section. The mold dimensions for the dimples are approximately 0.160 inch in diameter by approximately 0.0145 inch deep, the dimples being arranged in an icosahedral array. The dimples or bowl shaped depressions are uniformly distributed about the surface of the core, and generate an icosahedral lattice of equilateral spherical triangles each containing an equal number of depressions. All circumferential pathways of substantial width (0.005 inch or greater) that may be circumscribed about the ball (except that at the flash line [parting line], which is the equator of the ball) will interest several of the depressions. The air stream rushing over the surface of the ball in flight contacts the dimples, causing the ball to exhibit improved aerodynamic characteristics. The dimples occupy approximately fifty percent of the area of the ball surface. Such a surface pattern is described in more detail in copending application Ser. No. 276,185 referred to above, the disclosure of which is hereby incorporated herein by reference.

Figure 3:
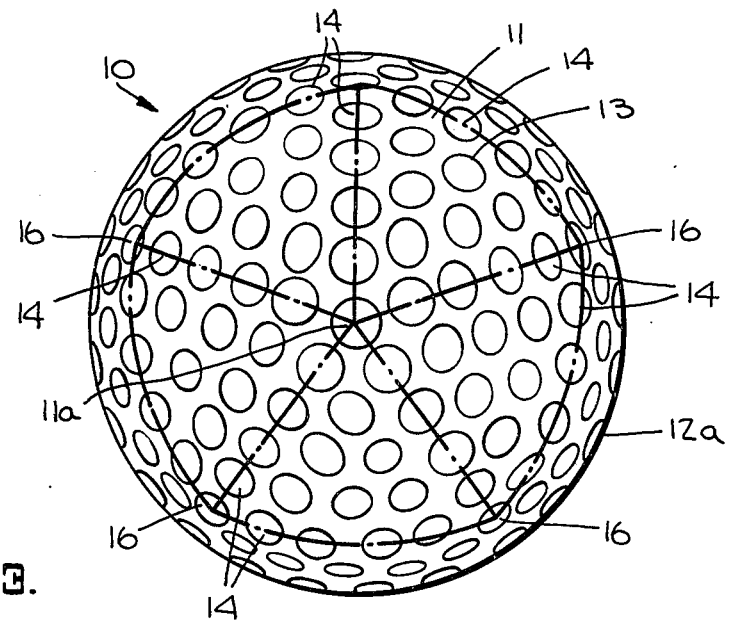
FIG. 3 is a top plan view similar to FIG. 1 having spatial pattern lines traced about the surface of the ball.
Figure 4:
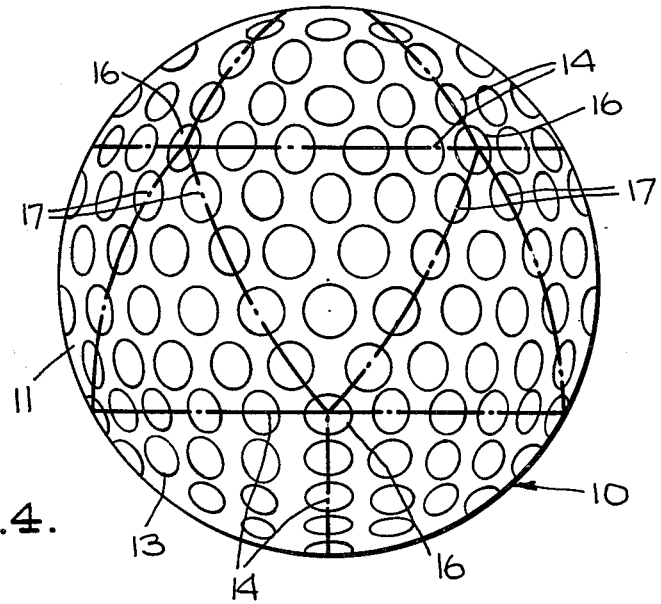
FIG. 4 is a front elevational view of the FIG. 3 ball with spatial pattern lines traced about the surface of the ball.
Figure 5:
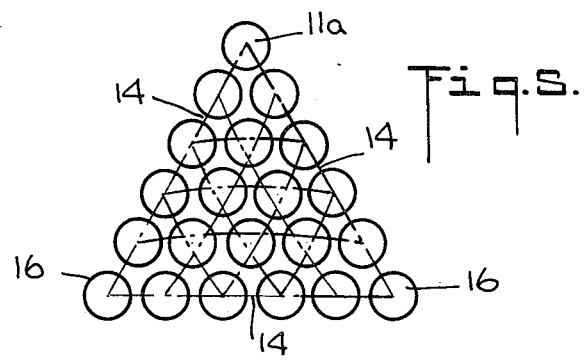
FIG. 5 is a view, on en enlarged scale, of a typical triangular surface section of the FIG. 3 golf ball as developed on a plane surface.

The geometry of the surface pattern of the dimples will be particularly apparent from inspection of FIGS. 3, 4 and 5 of the drawings. The ball has two poles 11a (only one of which appears in FIG. 3) and an equator 12a and each polar region is divisible into five similar equilateral triangles indicated by broken lines 14 with a common vertex at a given pole 11a. It will thus be realized that the dimples are distributed about the face of the ball to define an icosahedral lattice of equilateral spherical triangles. Each vertex 16 of equilateral triangles 14, 14, 14 other than the polar vertex 11a serves as a vertex for a similar equilateral triangle 14, 17, 17 having at least one vertex 16 across the equator 12a from another vertex 16 of the trianble 14, 17, 17. Referring to FIG. 5 of the drawings, there is represented a typical triangular surface portion 14, 14, 14 having its vertex at pole 11a developed as if on a planar surface. Dimples 16 are located at the other vertices. All lines intersecting dimples shown in FIG. 5 are arcs of great circles. The centers of the dimples included within the triangles 14, 14, 14 may be located at the vertices of the small triangles formed by the arcs of these great circles as shown in FIG. 5, in accordance with the disclosure of said application Ser. No. 276,185.

It is also explained in said application that in specifying the surface desired in a ball, it is accepted practice in the art to specify mold dimensions rather than ball dimensions because of the variability inherent in the production of molds and balls. A certain amount of shrinkage occurs, and the grinding operation to which the ball is subjected further alters the dimensions of the molded ball somewhat. Furthermore, the coating of paint applied to the ball slightly alters the surface. However, any discrepancies which may occur in the ultimate surface of the ball from that provided on the mold are small, and the exigencies of ball production make it acceptable and desirable to specify the ball surface in terms of the mold dimensions, with the understanding that in the final ball the dimensions are slightly different. Accordingly, it will be understood that throughout this specification and claims the ball surface is to be achieved by providing a mold having the stated dimensions, and that a ball produced in the described manner using such a mold will have substantially the optimum desirable dimensions after deflashing and painting.

The ball has superior flight performance (greater flight carry) to comparable previous two-piece golf balls. The golf ball of the invention is remarkable for its advantageous feel off the club, and the ball has the other properties highly desired in a golf ball including initial velocity, click, durability, rebound, compression (also called PGA stiffness or hardness), etc.

The following example will serve to illustrate the invention in more detail.

The following master batch for the golf ball core stock is prepared in a Banbury [trademark] mixer (all quantities shown herein being expressed in parts by weight):

| Core Stock Masterbatch | |
| --- | --- |
| Polybutadiene elastomer | 80 |
| Ionomer resin | 20 |
| Ground Calcium carbonate | 3.94 |
| Titanium dioxide (Rutile) | 1.60 |
| "Basic zinc methacrylate" | 31.07 |
| Trimethylol propane trimethacrylate | 5.11 |
| Litharge | 8.90 |
| White lead No. 202 | 5.93 |

| -continued | |
| --- | --- |
| Core Stock Masterbatch | |
| | 156.55 |

The polybutadiene elastomer is Mitsui BROI [trademark] rubber, 97% cis content. The ionomer resin is Surlyn [trademark] 1555, an ionic copolymer of approximately 96.5 mole-percent of ethylene and 3.5 mole-percent of methacrylic acid, with sodium ions uniformly distributed throughout the copolymer to an extent representing about 50% neutralization of the methacrylic acid, ASTM melt index of 10. The ground calcium carbonate is the commercial material Camel Wite [trademark]. The titanium dioxide is the commercial material Titanium RANC [trademark]. The "basic zinc methacrylate" is the preformed reaction product of zinc oxide and methacrylic acid in substantially equimolar quantities, as described above.

The final core compound is made by mixing the above core stock masterbatch with curative on a mill as follows:

Final Core Stock

Core stock masterbatch (as above): 156.65
Peroxide curative: 7.20
Blue color: 0.058

The peroxide curative is Percadox [trademark] 17/40, which is 40% active n-butyl 4,4-bis(t-butylperoxy) valerate on calcium carbonate. The blue color serves as an indicator of completeness of mixing.

A slug of the core stock is molded into spherical shape by compression molding and curing for 18–20 minutes at about 320° F. The molded sphere is approximately 1.64 inches in diameter; it is ground in the centerless grinder to a diameter of approximately 1.510 inches, plus or minus 0.005 inch.

The cover composition is prepared by mixing the following ingredients:

Cover Composition

Suryln 1555: 50
Surlyn 1557: 50
Titanium dioxide: 1 The Suryln 1555 is as described previously; Surlyn 1557 is similar but contains zinc as the metal in place of sodium. The cover is injection molded directly onto the core while the core is suspended in the center of a spherical mold cavity larger than the core, the core being suspended concentrically of the mold cavity by five retractable pins in each half of the two-part mold. The cover stock is injection molded at a molding maching temperature of 475° F. into the mold which is cooled to a temperature of 40°-60° F. There are eight points of injection spaced around the equatorial parting line of the mold. As the space defined between the inner surface of the mole and the outer surface of the core becomes filled with cover stock, the pins are withdrawn. It will be understood that the surface of the mold cavity is provided with convex protusions of the dimensions indicated above for forming the dimple pattern in the outer surface of the cover. The inner end of each retractable pin is rounded so that when it is withdrawn to the plane of the mold surface it serves to form a dimple on the surface of the cover in the conventional way. The dwell time in the mold is thirty seconds. The ball is removed from the mold and degated, and centerless ground to remove flash. As indicated previously this deflashing operation also improves the flight characteristics of the ball. After wet blasting with 220–400 grit (aluminum oxide) and scrubbing, the ball is primed, painted and decorated in the usual manner.

The final average diameter of the ball is approximately 1.680 inches (as compared to approximately 1.682 inches before grinding). The PGA hardness (also called stiffness or compression) is 88, the weight is 1.612 ounces. Rebound is 75%.

The flight characteristics of the ball may be determined with the aid of a hitting machine. In such a test with the machine adjusted to simulate pro conditions, balls of the invention shouwed a carry of 203.4 yards, and a total distance (carry plus roll) of 265.2 yards. This compares to a carry of 198.8 yards and a total distance of 261.5 yards for comparable conventional two-piece solid balls with 336 dimples on the surface. With the hitting machine adjusted to less severe average player conditions the balls of the invention had a carry of 185.0 yards and a total distance of 255.2 yards, as compared to a carry of 181.3 yards and a total distance of 252 yards for the conventional balls under the same conditions.

We claim:

1. A solid two-piece molded golf ball having a spherical core having a diameter of 1.505 inches, a PGA compression of 65, a rebound of at least 75% and a specific gravity of 1.20, the said core comprising a cross-linked composition containing 100 parts by weight of polybutadiene elastomer having a cis-1,4-polybutadiene content of 50% by weight or more and from 10 to 60 parts by weight of preformed zinc oxide-methacrylic acid reaction product in which the zinc oxide and methacrylic acid are combined in the proportions required by basic zinc methacrylate, said preformed reaction product being finely ground to a fineness such that at least 99% passes a 325 mesh sieve, said core composition containing a free radical generating curing agent in amount sufficient to cure the composition, the said core being surrounded by a cover composition of sufficient thickness to provide a ball diameter of 1.680 inches, said cover composition comprising an ionomer resin which is a thermoplastic, resinous ionic copolymer of an olefin having from 2 to 8 carbon atoms and a metal salt of an unsaturated monocarboxylic acid containing from 2 to 8 carbon atoms, the outer surface of the said cover being painted and having a dimple pattern consisting of essentially 252 dimples circular in cross-section, the dimensions of the dimples expressed as mold dimensions being 0.160 inch in diameter by 0.0145 inch deep, said dimples being arranged in an icosohedral array uniformly distributed on the surface of the ball and covering approximately fifty percent of the area of the ball surface, the molded ball having been deflashed by centerless grinding, whereby the ball exhibits improved flight characteristics.

* * * * *